(12) United States Patent
Cohn et al.

(10) Patent No.: US 10,138,826 B2
(45) Date of Patent: *Nov. 27, 2018

(54) FUEL MANAGEMENT SYSTEM FOR VARIABLE ETHANOL OCTANE ENHANCEMENT OF GASOLINE ENGINES

(71) Applicant: Massachusetts Institute of Technology, Cambridge, MA (US)

(72) Inventors: Daniel R. Cohn, Cambridge, MA (US); John B. Heywood, Newtonville, MA (US); Leslie Bromberg, Sharon, MA (US)

(73) Assignee: MASSACHUSETTS INSTITUTE OF TECHNOLOGY, Cambridge, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/716,675

(22) Filed: Sep. 27, 2017

(65) Prior Publication Data

US 2018/0016998 A1 Jan. 18, 2018

Related U.S. Application Data

(63) Continuation of application No. 15/463,425, filed on Mar. 20, 2017, now Pat. No. 9,810,166, and a
(Continued)

(51) Int. Cl.
*F02D 41/30* (2006.01)
*F02D 41/00* (2006.01)
(Continued)

(52) U.S. Cl.
CPC ............ *F02D 41/0025* (2013.01); *F02B 7/00* (2013.01); *F02B 17/00* (2013.01); *F02B 17/005* (2013.01);
(Continued)

(58) Field of Classification Search
CPC ............. F02D 41/0025; F02D 41/3094; F02D 35/027; F02D 11/105; F02D 2250/18;
(Continued)

(56) References Cited

U.S. PATENT DOCUMENTS 2,741,230 A 4/1956 Reynolds
3,089,470 A 5/1963 Payne
(Continued)

OTHER PUBLICATIONS

[No Author Listed] "Alternative Automotive Fuels," J1297_200209, Society of Automotive Engineers (SAE) Information Report, Sep. 13, 2002.
(Continued)

*Primary Examiner* — Hai Huynh
(74) *Attorney, Agent, or Firm* — Nutter McClennen & Fish LLP (57) ABSTRACT

Fuel management system for efficient operation of a spark ignition gasoline engine. Injectors inject an anti-knock agent such as ethanol directly into a cylinder of the engine. A fuel management microprocessor system controls injection of the anti-knock agent so as to control knock and minimize that amount of the anti-knock agent that is used in a drive cycle. It is preferred that the anti-knock agent is ethanol. The use of ethanol can be further minimized by injection in a non-uniform manner within a cylinder. The ethanol injection suppresses knock so that higher compression ratio and/or engine downsizing from increased turbocharging or supercharging can be used to increase the efficiency or the engine.

33 Claims, 3 Drawing Sheets

Related U.S. Application Data continuation of application No. 14/982,086, filed on Dec. 29, 2015, now Pat. No. 9,695,784, and a continuation of application No. 14/478,069, filed on Sep. 5, 2014, now Pat. No. 9,255,519, and a continuation of application No. 14/249,806, filed on Apr. 10, 2014, now Pat. No. 8,857,410, and a continuation of application No. 13/956,498, filed on Aug. 1, 2013, now Pat. No. 8,733,321, and a continuation of application No. 13/629,836, filed on Sep. 28, 2012, now Pat. No. 8,522,746, and a continuation of application No. 13/368,382, filed on Feb. 8, 2012, now Pat. No. 8,302,580, and a continuation of application No. 13/282,787, filed on Oct. 27, 2011, now Pat. No. 8,146,568, and a continuation of application No. 13/117,448, filed on May 27, 2011, now Pat. No. 8,069,839, and a continuation of application No. 12/815,842, filed on Jun. 15, 2010, now Pat. No. 7,971,572, and a continuation of application No. 12/329,729, filed on Dec. 8, 2008, now Pat. No. 7,762,233, and a continuation of application No. 11/840,719, filed on Aug. 17, 2007, now Pat. No. 7,740,004, and a continuation of application No. 10/991,774, filed on Nov. 18, 2004, now Pat. No. 7,314,033.

(51) Int. Cl.

| | | |
|---|---|---|
| *F02B 47/04* | (2006.01) | |
| *F02B 51/00* | (2006.01) | |
| *F02M 25/14* | (2006.01) | |
| *F02D 19/08* | (2006.01) | |
| *F02B 17/00* | (2006.01) | |
| *F02B 7/00* | (2006.01) | |
| *F02B 47/00* | (2006.01) | |
| *F02M 25/00* | (2006.01) | |
| *F02D 35/02* | (2006.01) | |
| *F02P 5/04* | (2006.01) | |
| *F02D 41/38* | (2006.01) | |

(52) U.S. Cl.
CPC .............. *F02B 47/00* (2013.01); *F02B 47/04* (2013.01); *F02B 51/00* (2013.01); *F02D 19/08* (2013.01); *F02D 19/081* (2013.01); *F02D 35/027* (2013.01); *F02D 41/3094* (2013.01); *F02M 25/00* (2013.01); *F02M 25/14* (2013.01); *F02P 5/045* (2013.01); *F02D 2041/389* (2013.01); *F02D 2200/1002* (2013.01); *Y02T 10/148* (2013.01)

(58) Field of Classification Search
CPC ...... F02D 2200/1002; F02D 2041/389; F02M 25/14; F02M 69/046; F02P 5/045; F02B 47/04
USPC ....... 123/431, 198 A, 406.23, 575, 576, 577, 123/578; 701/103, 110, 111
See application file for complete search history.

(56) References Cited

U.S. PATENT DOCUMENTS

| | | |
|---|---|---|
| 3,106,194 A | 10/1963 | Cantwell et al. |
| 3,557,763 A | 1/1971 | Probst |
| 3,822,119 A | 7/1974 | Frech et al. |
| 4,031,864 A | 6/1977 | Crothers |
| 4,056,087 A | 11/1977 | Boyce |
| 4,182,278 A | 1/1980 | Coakwell |
| 4,230,072 A | 10/1980 | Noguchi et al. |
| 4,312,310 A | 1/1982 | Chivilo' et al. |
| 4,402,296 A | 9/1983 | Schwarz |
| 4,480,616 A | 11/1984 | Takeda |
| 4,495,930 A | 1/1985 | Nakajima |
| 4,541,383 A | 9/1985 | Jessel |
| 4,594,201 A | 6/1986 | Phillips et al. |
| 4,596,277 A | 6/1986 | Djordjevic |
| 4,721,081 A | 1/1988 | Krauja et al. |
| 4,876,988 A | 10/1989 | Paul et al. |
| 4,958,598 A | 9/1990 | Fosseen |
| 4,967,714 A | 11/1990 | Inoue |
| 4,974,416 A | 12/1990 | Taylor |
| 4,993,386 A | 2/1991 | Ozasa et al. |
| 5,179,923 A | 1/1993 | Tsurutani et al. |
| 5,233,944 A | 8/1993 | Mochizuki |
| 5,497,744 A | 3/1996 | Nagaosa et al. |
| 5,560,344 A | 10/1996 | Chan |
| 5,715,788 A | 2/1998 | Tarr et al. |
| 5,911,210 A | 6/1999 | Flach |
| 5,937,799 A | 8/1999 | Binion |
| 5,983,855 A | 11/1999 | Benedikt et al. |
| 6,073,607 A | 6/2000 | Liber |
| 6,076,487 A | 6/2000 | Wulff et al. |
| 6,112,705 A | 9/2000 | Nakayama et al. |
| 6,260,525 B1 | 7/2001 | Moyer |
| 6,287,351 B1 | 9/2001 | Wulff et al. |
| 6,298,838 B1 | 10/2001 | Huff et al. |
| 6,321,692 B1 | 11/2001 | Rayner |
| 6,332,448 B1 | 12/2001 | Ilyama et al. |
| 6,340,015 B1 | 1/2002 | Benedikt et al. |
| 6,358,180 B1 | 3/2002 | Kuroda et al. |
| 6,505,579 B1 | 1/2003 | Lee |
| 6,508,233 B1 | 1/2003 | Suhre et al. |
| 6,513,505 B2 | 2/2003 | Watanabe et al. |
| 6,536,405 B1 | 3/2003 | Rieger et al. |
| 6,543,423 B2 | 4/2003 | Dobryden et al. |
| 6,561,157 B2 | 5/2003 | zur Loye et al. |
| 6,575,147 B2 | 6/2003 | Wulff et al. |
| 6,622,663 B2 | 9/2003 | Weissman et al. |
| 6,655,324 B2 | 12/2003 | Cohn et al. |
| 6,668,804 B2 | 12/2003 | Dobryden et al. |
| 6,725,827 B2 | 4/2004 | Ueda et al. |
| 6,745,744 B2 | 6/2004 | Suckewer et al. |
| 6,748,918 B2 | 6/2004 | Rieger et al. |
| 6,755,175 B1 | 6/2004 | McKay et al. |
| 6,799,551 B2 | 10/2004 | Nakakita et al. |
| 6,892,691 B1 | 5/2005 | Uhl et al. |
| 6,951,202 B2 | 10/2005 | Oda |
| 6,955,154 B1 | 10/2005 | Douglas |
| 6,959,693 B2 | 11/2005 | Oda |
| 6,981,487 B2 | 1/2006 | Ohtani |
| 6,990,956 B2 | 1/2006 | Niimi |
| 7,013,847 B2 | 3/2006 | Auer |
| 7,021,277 B2 | 4/2006 | Kuo et al. |
| 7,028,644 B2 | 4/2006 | Cohn et al. |
| 7,077,100 B2 | 7/2006 | Vogel et al. |
| 7,086,376 B2 | 8/2006 | McKay |
| 7,107,942 B2 | 9/2006 | Weissman et al. |
| 7,150,265 B2 | 12/2006 | Shibagaki |
| 7,152,574 B2 | 12/2006 | Mashiki et al. |
| 7,156,070 B2 | 1/2007 | Strom et al. |
| 7,159,568 B1 | 1/2007 | Lewis et al. |
| 7,178,503 B1 | 2/2007 | Brehob |
| 7,188,607 B2 | 3/2007 | Kobayashi |
| 7,201,136 B2 | 4/2007 | McKay et al. |
| 7,225,787 B2 | 6/2007 | Bromberg et al. |
| 7,255,080 B1 | 8/2007 | Leone |
| 7,258,102 B2 | 8/2007 | Kinose et al. |
| 7,258,103 B2 | 8/2007 | Tahara et al. |
| 7,263,973 B2 | 9/2007 | Akita et al. |
| 7,270,112 B2 | 9/2007 | Kinose |
| 7,275,515 B2 | 10/2007 | Ikoma |
| 7,275,519 B2 | 10/2007 | Miyazaki et al. |
| 7,278,397 B2 | 10/2007 | Kobayashi |
| 7,302,933 B2 | 12/2007 | Kerns |
| 7,314,033 B2 | 1/2008 | Cohn et al. |
| 7,320,302 B2 | 1/2008 | Kobayashi |
| 7,370,609 B2 | 5/2008 | Kamio |
| 7,395,786 B2 | 7/2008 | Leone et al. |
| 7,406,947 B2 | 8/2008 | Lewis et al. |

(56) References Cited

U.S. PATENT DOCUMENTS

| | | |
|---|---|---|
| 7,444,987 B2 | 11/2008 | Cohn et al. |
| 7,461,628 B2 | 12/2008 | Blumberg et al. |
| 7,484,495 B2 | 2/2009 | Kamio et al. |
| 7,533,651 B2 | 5/2009 | Surnilla |
| 7,546,835 B1 | 6/2009 | Hilditch |
| 7,556,030 B2 | 7/2009 | Ashida et al. |
| 7,578,281 B2 | 8/2009 | Russell et al. |
| 7,581,528 B2 | 9/2009 | Stein et al. |
| 7,587,998 B2 | 9/2009 | Hotta et al. |
| 7,594,498 B2 | 9/2009 | Lewis et al. |
| 7,640,914 B2 | 1/2010 | Lewis et al. |
| 7,640,915 B2 | 1/2010 | Cohn et al. |
| 7,681,554 B2 | 3/2010 | Stein et al. |
| 7,721,703 B2 | 5/2010 | Kakuho et al. |
| 7,740,004 B2 | 6/2010 | Cohn et al. |
| 7,762,233 B2 | 7/2010 | Cohn et al. |
| 7,765,982 B2 | 8/2010 | Lewis et al. |
| 7,841,325 B2 | 11/2010 | Cohn et al. |
| 7,849,842 B1 | 12/2010 | Lewis et al. |
| 7,869,930 B2 | 1/2011 | Stein et al. |
| 7,971,572 B2 | 7/2011 | Cohn et al. |
| 8,069,839 B2 | 12/2011 | Cohn et al. |
| 8,078,386 B2 | 12/2011 | Stein et al. |
| 8,132,555 B2 | 3/2012 | Lewis et al. |
| 8,146,568 B2 | 4/2012 | Cohn et al. |
| 8,171,915 B2 | 5/2012 | Cohn et al. |
| 8,276,565 B2 | 10/2012 | Cohn et al. |
| 8,302,580 B2 | 11/2012 | Cohn et al. |
| 8,353,269 B2 | 1/2013 | Kasseris et al. |
| 8,393,312 B2 | 3/2013 | Lewis et al. |
| 8,522,746 B2 | 9/2013 | Cohn et al. |
| 8,707,913 B2 | 4/2014 | Cohn et al. |
| 8,733,321 B2 | 5/2014 | Cohn et al. |
| 8,857,410 B2 | 10/2014 | Cohn et al. |
| 8,997,711 B2 | 4/2015 | Cohn et al. |
| 9,255,519 B2 * | 2/2016 | Cohn ................ F02B 47/04 |
| 9,695,784 B2 | 7/2017 | Cohn et al. |
| 9,810,166 B2 * | 11/2017 | Cohn ................ F02B 47/04 |
| 2002/0014226 A1 | 2/2002 | Wulff et al. |
| 2004/0065274 A1 | 4/2004 | Cohn et al. |
| 2005/0098157 A1 | 5/2005 | Ohtani |
| 2006/0102136 A1 | 5/2006 | Bromberg et al. |
| 2006/0102145 A1 | 5/2006 | Cohn et al. |
| 2006/0102146 A1 | 5/2006 | Cohn et al. |
| 2007/0039588 A1 | 2/2007 | Kobayashi |
| 2007/0119391 A1 | 5/2007 | Fried et al. |
| 2007/0119414 A1 | 5/2007 | Leone et al. |
| 2007/0119422 A1 | 5/2007 | Lewis et al. |
| 2007/0215101 A1 | 9/2007 | Russell et al. |
| 2007/0215102 A1 | 9/2007 | Russell et al. |
| 2007/0215104 A1 | 9/2007 | Hahn |
| 2007/0215111 A1 | 9/2007 | Surnilla |
| 2007/0215130 A1 | 9/2007 | Shelby et al. |
| 2008/0060612 A1 | 3/2008 | Cohn et al. |
| 2008/0110434 A1 | 5/2008 | Cohn et al. |
| 2008/0168966 A1 | 7/2008 | Bromberg et al. |
| 2008/0228382 A1 | 9/2008 | Lewis et al. |
| 2009/0043478 A1 | 2/2009 | Labonte |
| 2009/0076705 A1 | 3/2009 | Colesworthy et al. |
| 2009/0084349 A1 | 4/2009 | Cohn et al. |
| 2009/0282810 A1 * | 11/2009 | Leone ................ F02D 19/081 60/285 |
| 2009/0292443 A1 * | 11/2009 | Stein ................ F02D 19/081 701/103 |
| 2009/0308367 A1 | 12/2009 | Glugla |
| 2010/0006050 A1 | 1/2010 | Bromberg et al. |
| 2010/0037859 A1 | 2/2010 | Mashiki |
| 2010/0070156 A1 | 3/2010 | Cohn et al. |
| 2010/0121559 A1 | 5/2010 | Bromberg et al. |
| 2010/0175659 A1 | 7/2010 | Cohn et al. |
| 2010/0288232 A1 | 11/2010 | Bromberg et al. |
| 2011/0030653 A1 | 2/2011 | Cohn et al. |
| 2011/0067674 A1 | 3/2011 | Kasseris et al. |
| 2011/0162620 A1 | 7/2011 | Bidner et al. |
| 2011/0186011 A1 | 8/2011 | Kubo et al. |
| 2011/0226210 A1 | 9/2011 | Cohn et al. |
| 2012/0029795 A1 | 2/2012 | Surnilla et al. |
| 2012/0042857 A1 | 2/2012 | Cohn et al. |
| 2012/0048231 A1 | 3/2012 | Bromberg et al. |
| 2012/0138015 A1 | 6/2012 | Cohn et al. |
| 2012/0152204 A1 | 6/2012 | Cohn et al. |
| 2012/0199100 A1 | 8/2012 | Kamio et al. |
| 2012/0312284 A1 | 12/2012 | Cohn et al. |
| 2013/0019839 A1 | 1/2013 | Cohn et al. |
| 2013/0261937 A1 | 10/2013 | Cohn et al. |
| 2013/0312701 A1 | 11/2013 | Cohn et al. |
| 2014/0216395 A1 | 8/2014 | Cohn et al. |
| 2014/0261345 A1 | 9/2014 | Bromberg et al. |
| 2014/0297159 A1 * | 10/2014 | Surnilla ............. F02D 41/3094 701/103 |
| 2014/0343825 A1 | 11/2014 | Cohn et al. |
| 2014/0373811 A1 | 12/2014 | Cohn et al. |
| 2015/0167590 A1 * | 6/2015 | Otto zur Loye ... F02M 21/0287 60/601 |
| 2015/0240737 A1 * | 8/2015 | Surnilla ............... F02D 41/008 123/435 |
| 2015/0285179 A1 | 10/2015 | Cohn et al. |
| 2015/0369162 A1 | 12/2015 | Cohn et al. |
| 2016/0138529 A1 | 5/2016 | Cohn et al. |
| 2017/0191431 A1 | 7/2017 | Cohn et al. |
| 2017/0321616 A1 * | 11/2017 | Miller ................ F02D 19/0615 |

OTHER PUBLICATIONS

Bromberg, L., et al. Calculations of Knock Suppression in Highly Turbocharged Gasoline/Ethanol Engines Using Direct Ethanol Injection, 2006, pp. 1-17, MIT Laboratory for Energy and the Environment Report, Cambridge, MA.

**Curran, H.J. et al., "A comprehensive modeling study of iso-octane oxidation," Combustion and Flame 129:263-280 (2002) pp. 253-280.

**Grandin, Borje and Hans-Erik Angstrom, Replacing Fuel Enrichment in a Turbo Charged SI Engine: Lean Burn or Cooled EGR, Society of Automotive Engineers, Inc., technical paper, 1999-01-3505, 1999 <https://doi.org/10.4271/1999-01-3505>.

**Grandin, Borje, Hans-Erik Angstrom, Per St Alhammar and Eric Olofsson, Knock Suppression in a Turbocharged SI Engine by Using Cooled EGR, Society of Automotive Engineers, Inc. 982476, International Fall Fuels and Lubricants Meeting and Exposition in San Francisco, California (Oct. 19-22, 1998).

**Heywood, J. B., "Internal Combustion Engine Fundamentals," McGraw Hill, 1988, p. 477.

**PCT International Search Report and Written Opinion, Appl. No. PCT/US05/041317, dated Apr. 6, 2006.

**PCT International Search Report and Written Opinion, Appl. No. PCT/US06/012750, dated Jun. 28, 2007.

**PCT International Search Report and Written Opinion, Application No. PCT/1807/03004, dated Jul. 9, 2008.

**PCT International Search Report and Written Opinion, Application No. PCT/US07/05777, dated Mar. 24, 2008.

**PCT International Search Report and Written Opinion, Application No. PCT/US07/74227, dated Feb. 25, 2008.

**PCT International Search Report and Written Opinion, Application No. PCT/US08/69171, dated Oct. 3, 2008.

PCT Invitation to Pay Additional Fees, Application No. PCT/US11/59911, dated Feb. 6, 2012.

**B. Lecointe and G. Monnier, "Downsizing a gasoline engine using turbocharging with direct injection" SAE paper 2003-1-0542.

Lee, R. J., et al., CHEMKIN 4.0 Theory Manual; Reaction Design, Inc., San Diego, Calif. (2004).

**LoRusso, Julian A., et al., Direct Injection Ignition Assisted Alcohol Engine, Society of Automotive Engineers, Inc. 880495, International Congress and Exposition in Detroit Michigan (Feb. 29-Mar. 4, 1998).

**Modak, A., et al., Engine Cooling by Direct Injection of Cooling Water, Society of Automotive Engineers, Inc. technical paper 700887, 1970. DOI: 10.4271/700887.

(56) References Cited

OTHER PUBLICATIONS

\*\*Stan, C., R., et al., Internal Mixture Formation and Combustion—from Gasoline to Ethanol, Society of Automotive Engineers, Inc., 2001 World Congress, Mar. 2001, DOI: 10.4271/2001-01-1207.
\*\*Stokes, J., et al., "A Gasoline Engine Concept for Improved Fuel Economy—The Lean Boost System," SAE Technical Paper 2000-01-2902, 2000, <https://doi.org/10.4271/2000-1-2902>, pp. 1-12.
Thomas, J., et al, "Fuel-Borne Reductants for NOx Aftertreatment: Preliminary EtOH SCR Study," 2003 DEER (Diesel Engine Emissions Reduction] Workshop, Newport RI Aug. 2003].
\*\*USPTO Non-Final Office Action, U.S. Appl. No. 10/991,774, dated Apr. 25, 2006.
\*\*USPTO Final Office Action, U.S. Appl. No. 10/991,774, dated Sep. 27, 2006.
\*\*USPTO Non-Final Office Action, U.S. Appl. No. 10/991,774, dated May 25, 2007.
\*\*USPTO Non-Final Office Action, U.S. Appl. No. 11/100,026, dated Aug. 3, 2006.
\*\*USPTO Non-Final Office Action, U.S. Appl. No. 11/229,755, dated Mar. 22, 2007.
\*\*USPTO Non-Final Office Action, U.S. Appl. No. 11/229,755, dated Oct. 4, 2007.
\*\*USPTO Non-Final Office Action, U.S. Appl. No. 11/682,372, dated Jan. 2, 2008.
\*\*USPTO Final Office Action, U.S. Appl. No. 11/682,372, dated Oct. 17, 2008.
\*\*USPTO Non-Final Office Action, U.S. Appl. No. 11/684,100, dated Jun. 3, 2008.
\*\*USPTO Notice of Allowance, U.S. Appl. No. 11/684,100, dated Mar. 3, 2009.
\*\*USPTO Non-Final Office Action, U.S. Appl. No. 11/840,719, dated Jul. 11, 2008.
\*\*Yuksel, F., et al, The Use of Ethanol-Gasoline Blend as a Fuel in an SI Engine, Renewable Energy, vol. 29, Jun. 2004, pp. 1181-1191.

\* cited by examiner

FUEL MANAGEMENT SYSTEM FOR VARIABLE ETHANOL OCTANE ENHANCEMENT OF GASOLINE ENGINES

This application is a continuation of U.S. patent application Ser. No. 15/463,425 filed on Mar. 20, 2017, which is a continuation of U.S. patent application Ser. No. 14/982,086 filed on Dec. 29, 2015, which is a continuation of U.S. patent application Ser. No. 14/478,069 filed on Sep. 5, 2014, which is a continuation of U.S. patent application Ser. No. 14/249,806 filed on Apr. 10, 2014, which is now issued as U.S. Pat. No. 8,857,410, which is a continuation of U.S. patent application Ser. No. 13/956,498 filed on Aug. 1, 2013, which is now issued as U.S. Pat. No. 8,733,321, which is a continuation of U.S. patent application Ser. No. 13/629,836 filed on Sep. 28, 2012, which is now issued as U.S. Pat. No. 8,522,746, which is a continuation of U.S. patent application Ser. No. 13/368,382 filed on Feb. 8, 2012, which is now issued as U.S. Pat. No. 8,302,580, which is a continuation of U.S. patent application Ser. No. 13/282,787 filed Oct. 27, 2011, which is now issued as U.S. Pat. No. 8,146,568, which is a continuation of U.S. patent application Ser. No. 13/117,448 filed May 27, 2011, which is now issued as U.S. Pat. No. 8,069,839, which is a continuation of U.S. patent application Ser. No. 12/815,842, filed Jun. 15, 2010, which is now issued as U.S. Pat. No. 7,971,572, which is a continuation of U.S. patent application Ser. No. 12/329,729 filed on Dec. 8, 2008, which is now issued as U.S. Pat. No. 7,762,233, which is a continuation of U.S. patent application Ser. No. 11/840,719 filed on Aug. 17, 2007, which is now issued as U.S. Pat. No. 7,740,004, which is a continuation of U.S. patent application Ser. No. 10/991,774, which is now issued as U.S. Pat. No. 7,314,033.

BACKGROUND

This invention relates to spark ignition gasoline engines utilizing an antiknock agent which is a liquid fuel with a higher octane number than gasoline such as ethanol to improve engine efficiency.

It is known that the efficiency of spark ignition (SI) gasoline engines can be increased by high compression ratio operation and particularly by engine downsizing. The engine downsizing is made possible by the use of substantial pressure boosting from either turbocharging or supercharging. Such pressure boosting makes it possible to obtain the same performance in a significantly smaller engine. See, J. Stokes, et al., "A Gasoline Engine Concept For Improved Fuel Economy The Lean-Boost System," SAE Paper 2001-01-2902. The use of these techniques to increase engine efficiency, however, is limited by the onset of engine knock. Knock is the undesired detonation of fuel and can severely damage an engine. If knock can be prevented, then high compression ratio operation and high pressure boosting can be used to increase engine efficiency by up to twenty-five percent.

Octane number represents the resistance of a fuel to knocking but the use of higher octane gasoline only modestly alleviates the tendency to knock. For example, the difference between regular and premium gasoline is typically six octane numbers. That is significantly less than is needed to realize fully the efficiency benefits of high compression ratio or turbocharged operation. There is thus a need for a practical means for achieving a much higher level of octane enhancement so that engines can be operated much more efficiently.

It is known to replace a portion of gasoline with small amounts of ethanol added at the refinery. Ethanol has a blending octane number (ON) of 110 (versus 95 for premium gasoline) (see J. B. Heywood, "Internal Combustion Engine Fundamentals," McGraw Hill, 1988, p. 477) and is also attractive because it is a renewable energy, biomass-derived fuel, but the small amounts of ethanol that have heretofore been added to gasoline have had a relatively small impact on engine performance. Ethanol is much more expensive than gasoline and the amount of ethanol that is readily available is much smaller than that of gasoline because of the relatively limited amount of biomass that is available for its production. An object of the present invention is to minimize the amount of ethanol or other antiknock agent that is used to achieve a given level of engine efficiency increase. By restricting the use of ethanol to the relatively small fraction of time in an operating cycle when it is needed to prevent knock in a higher load regime and by minimizing its use at these times, the amount of ethanol that is required can be limited to a relatively small fraction of the fuel used by the spark ignition gasoline engine.

SUMMARY

In one aspect, the invention is a fuel management system for efficient operation of a spark ignition gasoline engine including a source of an antiknock agent such as ethanol. An injector directly injects the ethanol into a cylinder of the engine and a fuel management system controls injection of the antiknock agent into the cylinder to control knock with minimum use of the antiknock agent. A preferred antiknock agent is ethanol. Ethanol has a high heat of vaporization so that there is substantial cooling of the air-fuel charge to the cylinder when it is injected directly into the engine. This cooling effect reduces the octane requirement of the engine by a considerable amount in addition to the improvement in knock resistance from the relatively high octane number of ethanol. Methanol, tertiary butyl alcohol, MTBE, ETBE, and TAME may also be used. Wherever ethanol is used herein it is to be understood that other antiknock agents are contemplated.

The fuel management system uses a fuel management control system that may use a microprocessor that operates in an open loop fashion on a predetermined correlation between octane number enhancement and fraction of fuel provided by the antiknock agent. To conserve the ethanol, it is preferred that it be added only during portions of a drive cycle requiring knock resistance and that its use be minimized during these times. Alternatively, the gasoline engine may include a knock sensor that provides a feedback signal to a fuel management microprocessor system to minimize the amount of the ethanol added to prevent knock in a closed loop fashion.

In one embodiment the injectors stratify the ethanol to provide non-uniform deposition within a cylinder. For example, the ethanol may be injected proximate to the cylinder walls and swirl can create a ring of ethanol near the walls.

In another embodiment of this aspect of the invention, the system includes a measure of the amount of the antiknock agent such as ethanol in the source containing the antiknock agent to control turbocharging, supercharging or spark retard when the amount of ethanol is low.

The direct injection of ethanol provides substantially a 13° C. drop in temperature for every ten percent of fuel energy provided by ethanol. An instantaneous octane enhancement of at least 4 octane numbers may be obtained for every 20 percent of the engine's energy coming from the ethanol.

DETAILED DESCRIPTION

Figure 1:
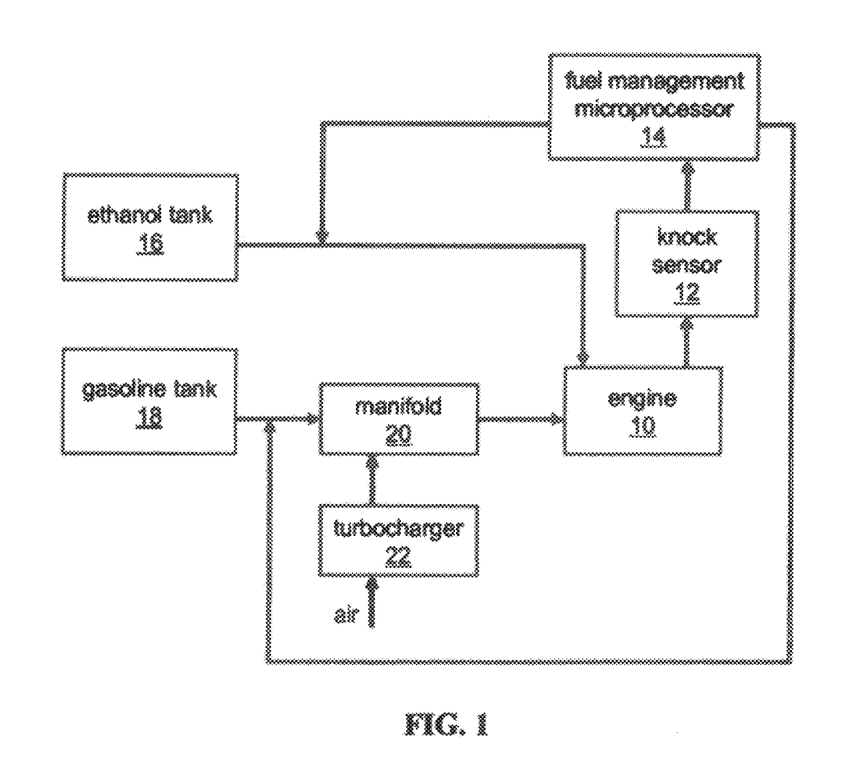
FIG. 1 is a block diagram of one embodiment of the invention disclosed herein.

With reference first to FIG. 1, a spark ignition gasoline engine 10 includes a knock sensor 12 and a fuel management microprocessor system 14. The fuel management microprocessor system 14 controls the direct injection of an antiknock agent such as ethanol from an ethanol tank 16. The fuel management microprocessor system 14 also controls the delivery of gasoline from a gasoline tank 18 into engine manifold 20. A turbocharger 22 is provided to improve the torque and power density of the engine 10. The amount of ethanol injection is dictated either by a predetermined correlation between octane number enhancement and fraction of fuel that is provided by ethanol in an open loop system or by a closed loop control system that uses a signal from the knock sensor 12 as an input to the fuel management microprocessor 14. In both situations, the fuel management processor 14 will minimize the amount of ethanol added to a cylinder while still preventing knock. It is also contemplated that the fuel management microprocessor system 14 could provide a combination of open and closed loop control.

As show in FIG. 1 it is preferred that ethanol be directly injected into the engine 10. Direct injection substantially increases the benefits of ethanol addition and decreases the required amount of ethanol. Recent advances in fuel injector and electronic control technology allows fuel injection directly into a spark ignition engine rather than into the manifold 20. Because ethanol has a high heat of vaporization there will be substantial cooling when it is directly injected into the engine 10. This cooling effect further increases knock resistance by a considerable amount. In the embodiment of FIG. 1 port fuel injection of the gasoline in which the gasoline is injected into the manifold rather than directly injected into the cylinder is preferred because it is advantageous in obtaining good air/fuel mixing and combustion stability that are difficult to obtain with direct injection.

Ethanol has a heat of vaporization of 840 kJ/kg, while the heat of vaporization of gasoline is about 350 kJ/kg. The attractiveness of ethanol increases when compared with gasoline on an energy basis, since the lower heating value of ethanol is 26.9 MJ/kg while for gasoline it is about 44 MJ/kg. Thus, the heat of vaporization per Joule of combustion energy is 0.031 for ethanol and 0.008 for gasoline. That is, for equal amounts of energy the required heat of vaporization of ethanol is about four times higher than that of gasoline. The ratio of the heat of vaporization per unit air required for stoichiometric combustion is about 94 kJ/kg of air for ethanol and 24 kJ/kg of air for gasoline, or a factor of four smaller. Thus, the net effect of cooling the air charge is about four times lower for gasoline than for ethanol (for stoichiometric mixtures wherein the amount of air contains oxygen that is just sufficient to combust all of the fuel).

Figure 2:
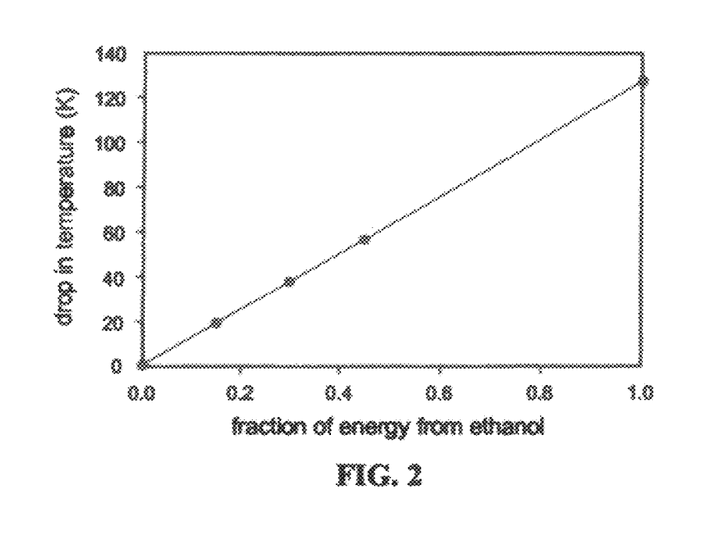
FIG. 2 is a graph of the drop in temperature within a cylinder as a function of the fraction of energy provided by ethanol.

In the case of ethanol direct injection according to one aspect of the invention, the charge is directly cooled. The amount of cooling due to direct injection of ethanol is shown in FIG. 2. It is assumed that the air/fuel mixture is stoichiometric without exhaust gas recirculation (EGR), and that gasoline makes up the rest of the fuel. It is further assumed that only the ethanol contributes to charge cooling. Gasoline is vaporized in the inlet manifold and does not contribute to cylinder charge cooling. The direct ethanol injection provides about 13° C. of cooling for each 10% of the fuel energy provided by ethanol. (It is also possible to use direct injection of gasoline as well as direct injection of ethanol. However, under certain conditions there can be combustion stability issues).

The temperature decrement because of the vaporization energy of the ethanol decreases with lean operation and with EGR, as the thermal capacity of the cylinder charge increases. If the engine operates at twice the stoichiometric air/fuel ratio, the numbers indicated in FIG. 2 decrease by about a factor of 2 (the contribution of the ethanol itself and the gasoline is relatively modest). Similarly, for a 20% EGR rate, the cooling effect of the ethanol decreases by about 25%.

The octane enhancement effect can be estimated from the data in FIG. 2. Direct injection of gasoline results in approximately a five octane number decrease in the octane number required by the engine, as discussed by Stokes, et al. Thus the contribution is about five octane numbers per 30K drop in charge temperature. As ethanol can decrease the charge temperature by about 120K, then the decrease in octane number required by the engine due to the drop in temperature, for 100% ethanol, is twenty octane numbers. Thus, when 100% of the fuel is provided by ethanol, the octane number enhancement is approximately thirty-five octane numbers with a twenty octane number enhancement coming from direct injection cooling and a fifteen octane number enhancement coming from the octane number of ethanol. From the above considerations, it can be projected that even if the octane enhancement from direct cooling is significantly lower, a total octane number enhancement of at least 4 octane numbers should be achievable for every 20% of the total fuel energy that is provided by ethanol.

Alternatively the ethanol and gasoline can be mixed together and then port injected through a single injector per cylinder, thereby decreasing the number of injectors that would be used. However, the air charge cooling benefit from ethanol would be lost.

Alternatively the ethanol and gasoline can be mixed together and then port fuel injected using a single injector per cylinder, thereby decreasing the number of injectors that would be used. However, the substantial air charge cooling benefit from ethanol would be lost. The volume of fuel between the mixing point and the port fuel injector should be minimized in order to meet the demanding dynamic octane-enhancement requirements of the engine.

Relatively precise determinations of the actual amount of octane enhancement from given amounts of direct ethanol injection can be obtained from laboratory and vehicle tests in addition to detailed calculations. These correlations can be used by the fuel management microprocessor system 14.

An additional benefit of using ethanol for octane enhancement is the ability to use it in a mixture with water. Such a mixture can eliminate the need for the costly and energy consuming water removal step in producing pure ethanol that must be employed when ethanol is added to gasoline at a refinery. Moreover, the water provides an additional cooling (due to vaporization) that further increases engine knock resistance. In contrast the present use of ethanol as an additive to gasoline at the refinery requires that the water be removed from the ethanol.

Since unlike gasoline, ethanol is not a good lubricant and the ethanol fuel injector can stick and not open, it is desirable to add a lubricant to the ethanol. The lubricant will also denature the ethanol and make it unattractive for human consumption.

Further decreases in the required ethanol for a given amount of octane enhancement can be achieved with stratification (non-uniform deposition) of the ethanol addition. Direct injection can be used to place the ethanol near the walls of the cylinder where the need for knock reduction is greatest. The direct injection may be used in combination with swirl. This stratification of the ethanol in the engine further reduces the amount of ethanol needed to obtain a given amount of octane enhancement. Because only the ethanol is directly injected and because it is stratified both by the injection process and by thermal centrifugation, the ignition stability issues associated with gasoline direct injection (GDI) can be avoided.

It is preferred that ethanol be added to those regions that make up the end-gas and are prone to auto-ignition. These regions arc near the walls of the cylinder. Since the end-gas contains on the order of 25% of the fuel, substantial decrements in the required amounts of ethanol can he achieved by stratifying the ethanol.

In the case of the engine 10 having substantial organized motion (such as swirl), the cooling will result in forces that thermally stratify the discharge (centrifugal separation of the regions at different density due to different temperatures). The effect of ethanol addition is to increase gas density since the temperature is decreased. With swirl the ethanol mixture will automatically move to the zone where the end-gas is, and thus increase the anti-knock effectiveness of the injected ethanol. The swirl motion is not affected much by the compression stroke and thus survives better than tumble-like motion that drives turbulence towards top-dead-center (TDC) and then dissipates. It should be pointed out that relatively modest swirls result in large separating (centrifugal) forces. A 3 m/s swirl motion in a 5 cm radius cylinder generates accelerations of about 200 m/s$^2$, or about 20 g's.

Figure 3:
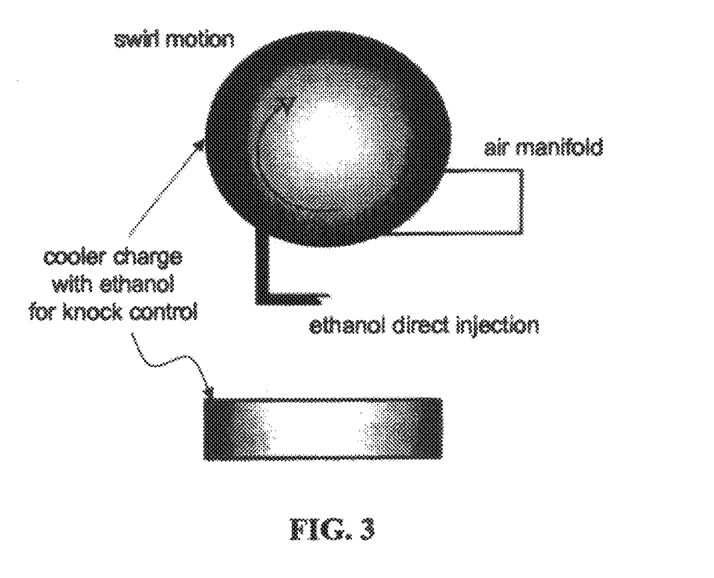
FIG. 3 is a schematic illustration of the stratification of cooler ethanol charge using direct injection and swirl motion for achieving thermal stratification.
Figure 4:
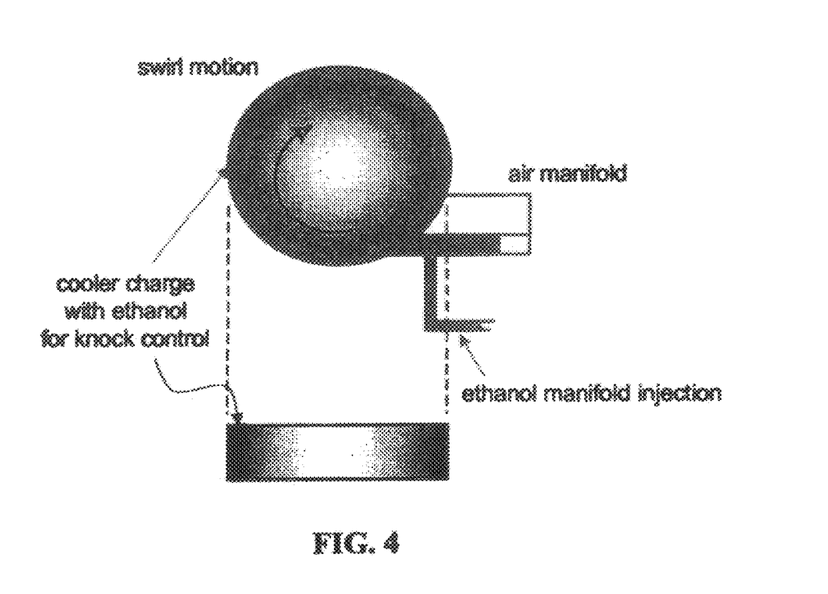
FIG. 4 is a schematic illustration showing ethanol stratified in an inlet manifold.

FIG. 3 illustrates ethanol direct injection and swirl motion for achieving thermal stratification. Ethanol is predominantly on an outside region which is the end-gas region. FIG. 4 illustrates a possible stratification of the ethanol in an inlet manifold with swirl motion and thermal centrifugation maintaining stratification in the cylinder. In this case of port injection of ethanol, however, the advantage of substantial charge cooling may be lost.

With reference again to FIG. 2, the effect of ethanol addition all the way up to 100% ethanol injection is shown. At the point that the engine is 100% direct ethanol injected, there may be issues of engine stability when operating with only stratified ethanol injection that need to be addressed. In the case of stratified operation it may also be advantageous to stratify the injection of gasoline in order to provide a relatively uniform equivalence ratio across the cylinder (and therefore lower concentrations of gasoline in the regions where the ethanol is injected). This situation can be achieved, as indicated in FIG. 4, by placing fuel in the region of the inlet manifold that is void of ethanol.

The ethanol used in the invention can either be contained in a separate tank from the gasoline or may be separated from a gasoline/ethanol mixture stored in one tank.

The instantaneous ethanol injection requirement and total ethanol consumption over a drive cycle can be estimated from information about the drive cycle and the increase in torque (and thus increase in compression ratio. engine power density, and capability for downsizing) that is desired. A plot of the amount of operating time spent at various values of torque and engine speed in FTP and US06 drive cycles can be used. It is necessary to enhance the octane number at each point in the drive cycle where the torque is greater than permitted for knock free operation with gasoline alone. The amount of octane enhancement that is required is determined by the torque level.

A rough illustrative calculation shows that only a small amount of ethanol might be needed over the drive cycle. Assume that it is desired to increase the maximum torque level by a factor of two relative to what is possible without direct injection ethanol octane enhancement. Information about the operating time for the combined FTP and US06 cycles shows that approximately only 10 percent of the time is spent at torque levels above 0.5 maximum torque and less than 1 percent of the time is spent above 0.9 maximum torque. Conservatively assuming that 100% ethanol addition is needed at maximum torque and that the energy fraction of ethanol addition that is required to prevent knock decreases linearly to zero at 50 percent of maximum torque, the energy fraction provided by ethanol is about 30 percent. During a drive cycle about 20 percent of the total fuel energy is consumed at greater than 50 percent of maximum torque since during the 10 percent of the time that the engine is operated in this regime, the amount of fuel consumed is about twice that which is consumed below 50 percent of maximum torque. The amount of ethanol energy consumed during the drive cycle is thus roughly around 6 percent (30 percent×0.2) of the total fuel energy.

In this case then, although 100% ethanol addition was needed at the highest value of torque, only 6% addition was needed averaged over the drive cycle. The ethanol is much more effectively used by varying the level of addition according to the needs of the drive cycle.

Because of the lower heat of combustion of ethanol, the required amount of ethanol would be about 9% of the weight of the gasoline fuel or about 9% of the volume (since the densities of ethanol and gasoline are comparable). A separate tank with a capacity of about 1.8 gallons would then be required in automobiles with twenty gallon gasoline tanks. The stored ethanol content would be about 9% of that of gasoline by weight, a number not too different from present-day reformulated gasoline. Stratification of the ethanol addition could reduce this amount by more than a factor of two. An on-line ethanol distillation system might alternatively be employed but would entail elimination or reduction of the increase torque and power available from turbocharging.

Figure 5:
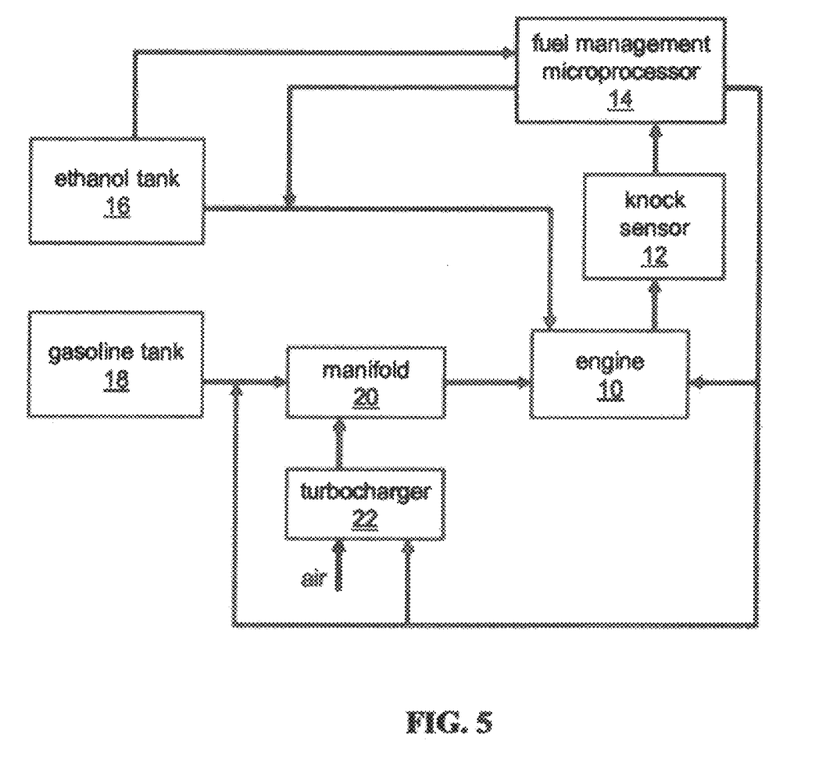
FIG. 5 is a block diagram of an embodiment of the invention in which the fuel management microprocessor is used to control a turbocharger and spark retard based upon the amount of ethanol in a fuel tank.

Because of the relatively small amount of ethanol and present lack of an ethanol fueling infrastructure, it is important that the ethanol vehicle be operable if there is no ethanol on the vehicle. The engine system can be designed such that although the torque and power benefits would be lower when ethanol is not available, the vehicle could still be operable by reducing or eliminating turbocharging capability and/or by increasing spark retard so as to avoid knock. As shown in FIG. 5, the fuel management microprocessor system 14 uses ethanol fuel level in the ethanol tank 16 as an input to control the turbocharger 22 (or supercharger or spark retard, not shown). As an example, with on-demand ethanol octane enhancement, a 4-cylinder engine can produce in the range of 280 horsepower with appropriate turbocharging or supercharging but could also be drivable with an engine power of 140 horsepower without the use of ethanol 300 according to the invention.

The impact of a small amount of ethanol upon fuel efficiency through use in a higher efficiency engine can greatly increase the energy value of the ethanol. For example, gasoline consumption could be reduced by 20% due to higher efficiency engine operation from use of a high compression ratio, strongly turbocharged operation and substantial engine downsizing. The energy value of the ethanol, including its value in direct replacement of gasoline (5% of the energy of the gasoline), is thus roughly equal to 25% of the gasoline that would have been used in a less efficient engine without any ethanol. The 5% gasoline equivalent energy value of ethanol has thus been leveraged up to a 25% gasoline equivalent value. Thus, ethanol can cost roughly up to five times that of gasoline on an energy basis and still be economically attractive. The use of ethanol as disclosed herein can be a much greater value use than in other ethanol applications.

Although the above discussion has featured ethanol as an exemplary anti-knock agent, the same approach can be applied to other high octane fuel and fuel additives with high vaporization energies such as methanol (with higher vaporization energy per unit fuel), and other anti-knock agents such as tertiary butyl alcohol, or ethers such as methyl tertiary butyl ether (MTBE), ethyl tertiary butyl ether (ETBE), or tertiary amyl methyl ether (TAME).

It is recognized that modifications and variations of the invention disclosed herein will be apparent to those of ordinary skill in the art and it is intended that all such modifications and variations be included within the scope of the appended claims.

The invention claimed is:

1. A fuel management system for a spark ignition engine that has a first fueling system that uses direct injection and also has a second fueling system that uses port fuel injection;
   and where the fueling is such that there is a first torque range where both the first and second fueling system are used throughout the range;
   and where the fraction of fueling provided by the first fueling system is higher at the highest value of torque in the first torque range than in the lowest value of torque in the first torque range;
   and where there is a second torque range where only the second fueling system is used;
   where when the torque is higher than the highest value of torque in the second torque range the engine is operated in the first torque range;
   and where the second torque range extends from zero torque to the highest torque in the second torque range.

2. The fuel management system of claim 1 where the fraction of fueling that is provided by the first fueling system in the first torque range increases with increasing torque.

3. The fuel management system of claim 1 where the fraction of fueling that is provided by the first fueling system in the first torque range increases with increasing torque in such a way that knock is prevented.

4. The fuel management system of claim 1 where the fraction of fueling that is provided by the first fueling system in the first torque range increases with increasing torque such that it is substantially equal to the fraction needed to prevent knock.

5. The fuel management system of claim 1 where in at least part of the first torque range closed loop control using a knock detector is used to increase the fraction of fueling that is provided by the first fueling system in the first torque range with increasing torque such that it is substantially equal to the fraction needed to prevent knock.

6. The fuel management system of claim 1 where in at least part of the first torque range closed loop control using a knock detector is used to increase the fraction of fueling that is provided by the first fueling system in the first torque range with increasing torque such that it is substantially equal to the fraction needed to prevent knock and where open loop control using a look up table is also employed.

7. The fuel management system of claim 1 where throughout the entire first torque range closed loop control using a knock detector is used to increase the fraction of fueling that is provided by the first fueling system in the first torque range with increasing torque such that it is substantially equal to the fraction needed to prevent knock.

8. The fuel management system of claim 1 where throughout the entire first torque range closed loop control using a knock detector is used to increase the fraction of fueling that is provided by the first fueling system in the first torque range with increasing torque such that it is substantially equal to the fraction needed to prevent knock and where open loop control using a look up table is also employed.

9. The fuel management system of claim 1 where if torque were increased beyond the highest torque in the second torque range fueling by the first fueling system alone would be needed to prevent knock.

10. The fuel management system of claim 1 where fueling from the first fueling system throughout the first torque range is minimized.

11. The fuel management system of claim 1 the highest torque in the second torque range is the highest torque at which the engine can be operated without the need for fueling from the first fueling system to prevent knock.

12. A fuel management system for a spark ignition engine that has a first fueling system that uses direct injection and also has a second fueling system that uses port fuel injection;
    and where the fueling is such that there is a first torque range where both the first and second fueling system are used throughout the range;
    and where there is a second torque range where only the second fueling system is used;
    where when the torque is higher than the highest value of torque in the second torque range the engine is operated in the first torque range;
    and where the second torque range extends from zero torque to the highest torque in the second torque range.

13. The fuel management system of claim 12 where the fraction of fuel provided by the first fueling system increases with increasing torque in at least part of the first torque range.

14. The fuel management system of claim 12 where the fraction of fuel provided by the first fueling system increases with increasing torque in at least part of the first torque range;
    and where spark retard is used to reduce the fraction of fuel that is provided by the first fueling system.

15. The fuel management system of claim 12 where the fraction of fuel provided by the first fueling system increases with increasing torque in at least part of the first torque range;
    and where spark retard is used to reduce the fraction of fuel provided by the first fueling system to zero.

16. The fuel management system of claim 12 where spark retard is used to reduce the fraction of fuel that is provided by the first fueling system.

17. The fuel management system of claim 12 where spark retard is used to reduce the fraction of fuel that is provided by the first fueling system;
and where the fuel management system uses information from a knock detector and a sensed parameter.

18. The fuel management system of claim 12 where spark retard is used to reduce the fraction of fuel that is provided by the first fueling system to zero.

19. The fuel management system of claim 12 where spark retard is used to reduce the fraction of fuel that is provided by the first fueling system to zero;
and where the fuel management system uses information from a knock detector and a sensed parameter.

20. The fuel management system of claim 12 where the fraction of fuel provided by the first fueling system in the first torque range increases with increasing torque;
and where spark retard is used to reduce the fraction of fuel that would otherwise be used.

21. A fuel management system for a spark ignition engine where a fuel is provided by a first fueling system using direct injection and by a second fueling system using port fuel injection;
and where there is a torque range throughout which both fueling systems are used;
and wherein as torque decreases the fraction of fueling provided by the first fueling system decreases;
and where there is second torque range where only the second fueling system is used.

22. The fuel management system of claim 21 where when the torque is higher than the highest torque in the second torque range the engine is operated in the first torque range.

23. The fuel management system of claim 22 where when the torque is higher than the highest torque in the second torque range the engine is operated in the first torque range;
and where the second fueling system is used from zero torque to the highest torque in the first torque range;
and where the highest torque in the first torque range is the highest torque at which the engine is operated with the use of both the first and second fueling systems;
and where in at least part of the first torque as torque is increased, the fraction of fuel that is provided by the first fueling system is such that it is substantially equal to that needed to prevent knock as torque is increased.

24. The fuel management system of claim 22 where when the torque is higher than the highest torque in the second torque range the engine is operated in the first torque range;
and where the second fueling system is used from zero torque to the highest torque in the first torque range;
and where the highest torque in the first torque range is the highest torque at which the engine is operated with the use of both the first and second fueling systems;
and where throughout the first torque range as torque is increased, the fraction of fuel that is provided by the first fueling system is such that it is substantially equal to that needed to prevent knock as torque is increased.

25. The fuel management system of claim 22 where when the torque is higher than the highest torque in the second torque range the engine is operated in the first torque range;
and where the second fueling system is used from zero torque to the highest torque in the first torque range;
and where the highest torque in the first torque range is the highest torque at which the engine is operated with the use of both the first and second fueling systems;
and where throughout the first torque range as torque is increased, the fraction of fuel that is provided by the first fueling system is such that it is substantially equal to that needed to prevent knock as torque is increased;
and where the highest torque in the first torque range is the highest torque at which the engine can be operated without the necessity of operating with use of the first fueling system alone.

26. The fuel management system of claim 22 where spark retard is employed so as to reduce the fraction of fuel that is provided by first fueling system.

27. The fuel management system of claim 22 where spark retard is employed so as to enable operation with the second fueling system alone where it would not otherwise be employed.

28. The fuel management system of claim 21 where when the torque is higher than the highest torque in the second torque range the engine is operated in the first torque range;
and where the second torque range extends from zero torque to the highest torque in the first torque range.

29. The fuel management system of claim 21 where when the torque is higher than the highest torque in the second torque range the engine is operated in the first torque range;
and where the second torque range extends from zero torque to the highest torque in the first torque range;
and where in at least part of the first torque range as torque is increased, the fraction of fuel that is provided by the first fueling system is such that it is substantially equal to that needed to prevent knock as torque is increased.

30. The fuel management system of claim 29 where when the torque is higher than the highest torque in the second torque range the engine is operated in the first torque range;
and where the second fueling system is used from zero torque to the highest torque in the first torque range;
and where throughout the first torque range as torque is increased, the fraction of fuel that is provided by the first fueling system is such that it is substantially equal to that needed to prevent knock as torque is increased.

31. A fuel management system for a spark ignition engine where a fuel is provided by a first fueling system using direct injection and by a second fueling system using port fuel injection;
and where there is a first torque range through which both fueling systems are used; and
wherein as torque decreases the fraction of fueling provided by the first fueling system decreases;
and where there is second torque range where only the second fueling system is used;
and where the second torque range extends from zero torque to the lowest torque in the first torque range;
and where spark retard is employed so as to reduce the fraction of fuel is provided by the first fueling system.

32. The fuel management system of claim 31 where in at least part of the first torque range the fraction of fuel that is provided by the first fueling system is substantially equal to that needed to prevent knock;
and where the fueling management system uses a knock sensor to control the fraction of fuel that is provided by the first fueling system;
and where spark retard is used to reduce the fraction of fuel provided by the first fueling system to zero.

33. The fuel management system of claim 31 where throughout the first torque range the fraction of fuel that is provided by the first fueling system is substantially equal to that needed to prevent knock;

and where the fueling management system uses a knock sensor and also open loop control using a lookup table to control the fraction of fuel that is provided by the first fueling system;

and where spark retard is used to reduce the fraction of fuel provided by the first fueling system to zero;

and where the fuel management system uses information from a knock detector and from a sensed parameter in the control of spark retard;

and where the highest torque in the second torque range is the highest torque at which the engine can be operation with the second fueling system alone without producing knock.

\* \* \* \* \*

(12) INTER PARTES REVIEW CERTIFICATE (2357th)
United States Patent  (10) Number: US 10,138,826 K1
Cohn et al.  (45) Certificate Issued: Sep. 7, 2021

(54) FUEL MANAGEMENT SYSTEM FOR VARIABLE ETHANOL OCTANE ENHANCEMENT OF GASOLINE ENGINES

(71) Applicants: Daniel R. Cohn; John B. Heywood; Leslie Bromberg

(72) Inventors: Daniel R. Cohn; John B. Heywood; Leslie Bromberg

(73) Assignee: MASSACHUSETTS INSTITUTE OF TECHNOLOGY

Trial Number:

IPR2019-01402 filed Aug. 13, 2019

Inter Partes Review Certificate for:

Patent No.: 10,138,826
Issued: Nov. 27, 2018
Appl. No.: 15/716,675
Filed: Sep. 27, 2017

The results of IPR2019-01402 are reflected in this inter partes review certificate under 35 U.S.C. 318(b).

INTER PARTES REVIEW CERTIFICATE
U.S. Patent 10,138,826 K1
Trial No. IPR2019-01402
Certificate Issued Sep. 7, 2021

AS A RESULT OF THE INTER PARTES REVIEW PROCEEDING, IT HAS BEEN DETERMINED THAT:

Claims 1-8, 10-24, 26, 27 and 31-33 are cancelled.

\* \* \* \* \*